United States Patent [19]
Gephardt

[11] Patent Number: 5,862,375
[45] Date of Patent: Jan. 19, 1999

[54] SYSTEM FOR EFFECTING COMMUNICATIONS BETWEEN A COMPUTING DEVICE AND A PLURALITY OF PERIPHERAL DEVICES

[75] Inventor: Douglas D. Gephardt, Austin, Tex.

[73] Assignee: Advanced Micro Devices, Inc., Sunnyvale, Calif.

[21] Appl. No.: 622,574

[22] Filed: Mar. 25, 1996

Related U.S. Application Data

[63] Continuation of Ser. No. 576,601, Aug. 31, 1990, abandoned.

[51] Int. Cl.$^6$ .......................................... G06F 00/00
[52] U.S. Cl. ........................ 395/651; 395/284; 395/285; 395/828; 395/830
[58] Field of Search ................................. 395/651, 652, 395/284–286, 289, 823, 824, 828–831

[56] References Cited

U.S. PATENT DOCUMENTS

| | | | |
|---|---|---|---|
| 4,589,063 | 5/1986 | Shah et al. | 395/828 |
| 4,622,633 | 11/1986 | Ceccon et al. | 395/651 |
| 4,633,392 | 12/1986 | Vincent et al. | 395/284 |
| 4,701,878 | 10/1987 | Gunkel et al. | 395/282 |
| 5,038,320 | 8/1991 | Heath et al. | . |
| 5,060,138 | 10/1991 | Gephardt et al. | 395/285 |
| 5,175,820 | 12/1992 | Gephardt | 395/834 |
| 5,491,804 | 2/1996 | Heath et al. | . |

FOREIGN PATENT DOCUMENTS

| | | |
|---|---|---|
| 0 041 406 | 12/1981 | European Pat. Off. . |
| 0 171 073 | 2/1986 | European Pat. Off. . |
| 57-106936 | 7/1982 | Japan . |

OTHER PUBLICATIONS

Starr, Robert R., "The Hewlett–Packard Human Interface Link", Hewlett–Packard Journal, vol. 38, No. 6, pp. 8–12.

DeHart, Scott, "A Standard Protocol For Host Computer–Peripheral Interface Allows Upgrading To The Latest Mass Storage Devices," 8080 Wescon Technical Papers, Oct. 30–Nov. 2 (1984), Anaheim, CA, pp. 1–5.

Thurber, Kenneth J., "A Systematic Approach To The Design of Digital Bussing Structures," Fall Joint Computer Conference, 1972 pp. 719–740.

Pasahow, Edward, "Microcomputer Interfacing For Electronics Technicians," McGraw–Hill, 1981, pp. 127–137.

*Primary Examiner*—Paul V. Kulik
*Attorney, Agent, or Firm*—Foley & Lardner

[57] ABSTRACT

A system for effecting communications between a computing device and a plurality of peripheral devices which comprises a bus controller for controlling the communications, a plurality of feedback generator circuits for providing operational status information, each of the plurality of peripheral devices having an associated one of the plurality of feedback generator circuits. The system further comprises a bus for conveying signals between the bus controller and the plurality of peripheral devices. In the preferred embodiment, each of the plurality of peripheral devices has a respective address and each of the plurality of feedback generator circuits contains the operational status information for its respective peripheral device. The bus controller interrogates the plurality of peripheral devices, each of which causes its respective feedback generator circuit to respond to such interrogation by communicating its respective operational status information to the bus controller when a respective of the peripheral devices indicates that such information is to be passed.

20 Claims, 4 Drawing Sheets

SYSTEM FOR EFFECTING COMMUNICATIONS BETWEEN A COMPUTING DEVICE AND A PLURALITY OF PERIPHERAL DEVICES

This is a continuation of U.S. Ser. No. 07/567,601 filed on Aug. 31, 1990, now abandoned.

CROSS REFERENCE TO RELATED APPLICATIONS

U.S. patent application Ser No. 08/071,940 filed Jun. 3, 1993, entitled "Integrated Digital Processing Apparatus," now U.S. Pat. No. 5,369,777 issued Nov. 29, 1994, which is a Continuation of U.S. patent application Ser. No. 07/576,012, filed Aug. 31, 1990;

U.S. patent application Ser. No. 07/800,862 filed Oct. 25, 1991, entitled "Apparatus for Use with a Computing Device Controlling Communications with a Plurality of Peripheral Devices, including a Feedback Bus to Indicate Operational Modes," now U.S. Pat. No. 5,175,820, issued Dec. 29, 1992;

U.S. patent application Ser. No. 08/097,868 filed Jul. 27, 1993, entitled "System for Controlling Communications Among a Computer Processing Unit and a Plurality of Peripheral Devices," now U.S. Pat. No. 5,313,597, issued May 17, 1994, which is a continuation of U.S. patent application Ser. No. 07/576,019, filed Aug. 31, 1990;

U.S. patent application Ser. No. 07/567,061, filed Aug. 31, 1990, entitled "Apparatus for Controlling Access to a Data Bus," now U.S. Pat. No. 5,218,681 issued Jun. 8, 1993; and U.S. patent application Ser. No. 07/576,695, filed Aug. 31, 1990, entitled "Apparatus for Use with a Computing Device for Generating a Substitute Acknowledgement to an Input when the Computing Device is in an Operational Hiatus," now U.S. Pat. No. 5,060,138, issued Oct. 22, 1991.

BACKGROUND OF THE INVENTION

The present invention is directed to a system for effecting communications between a computing device and a plurality of supporting peripheral devices associated with the computing device.

Prior art systems for effecting such communications involve a bus controller apparatus which polls peripheral devices, either sequentially or individually by respective addresses. The bus controller apparatus contains sufficient and appropriate circuitry to accommodate the different timing requirements which may exist among the various multiple peripherals communicating with the bus controller over a data bus. Generally, a feedback signal is sent by the peripheral device over the communicating data bus to the bus controller indicating completion of the operation in which the respective peripheral device is involved.

The present invention comprises a bus controller for polling individual respective peripheral devices by address and provides for each respective peripheral device to have an associated feedback generator circuit. Each respective peripheral device stores therein appropriate operational parameters for executing its intended operations. As the bus controller interrogates the peripheral devices by address, the peripheral devices respond by supplying the operational parameters necessary to effect operation.

By such a configuration, providing for each respective peripheral device to store therein its appropriate operational parameters, the bus controller is relieved of having to store a wide variety of operational parameters. Therefore, the preferred embodiment of the present invention is amenable to a modular system design, which is easily extendable to accommodate a greater number of peripheral devices.

SUMMARY OF THE INVENTION

The invention is a system for effecting communications between a computing device and a plurality of peripheral devices. The system comprises a bus controller for controlling communications, and a plurality of feedback generator circuits for providing operational status information, each of the plurality of peripheral devices having an associated one of the plurality of feedback generator circuits. The system further comprises a bus structure for conveying signals between the bus controller and the plurality of peripheral devices.

In the preferred embodiment of the present invention, each of the plurality of peripheral devices has a respective address, and each of the plurality of feedback generator circuits contains operational status information necessary for its respective associated peripheral device to operate. The bus controller interrogates an address-specified peripheral device, which peripheral device causes its respective feedback generator circuit to respond to such interrogation by communicating a feedback signal to the bus controller indicating the peripheral device is active and ready. When the peripheral device is in such an active and ready condition, it communicates its respective operational status information to the bus controller, thereby enabling the bus controller to effect the required passing of information associated with the intended operation of the active peripheral device.

It is, therefore, an object of the present invention to provide a system for effecting communications between a computing device and a plurality of peripheral devices in which operational parameters for respective peripheral devices are stored in the respective peripheral devices.

A further object of the present invention is to provide a system for effecting communications between a computing device and a plurality of peripheral devices which is amenable to expansion to accommodate additional peripheral devices.

Yet a further object of the present invention is to provide a system for effecting communications between a computing device and a plurality of peripheral devices which is amenable to modular design to effect such expansion to accommodate additional peripheral devices.

Further objects and features of the present invention will be apparent from the following specification and claims when considered in connection with the accompanying drawings illustrating the preferred embodiment of the invention.

DETAILED DESCRIPTION OF THE DRAWINGS

DETAILED DESCRIPTION OF THE INVENTION

Figure 1:
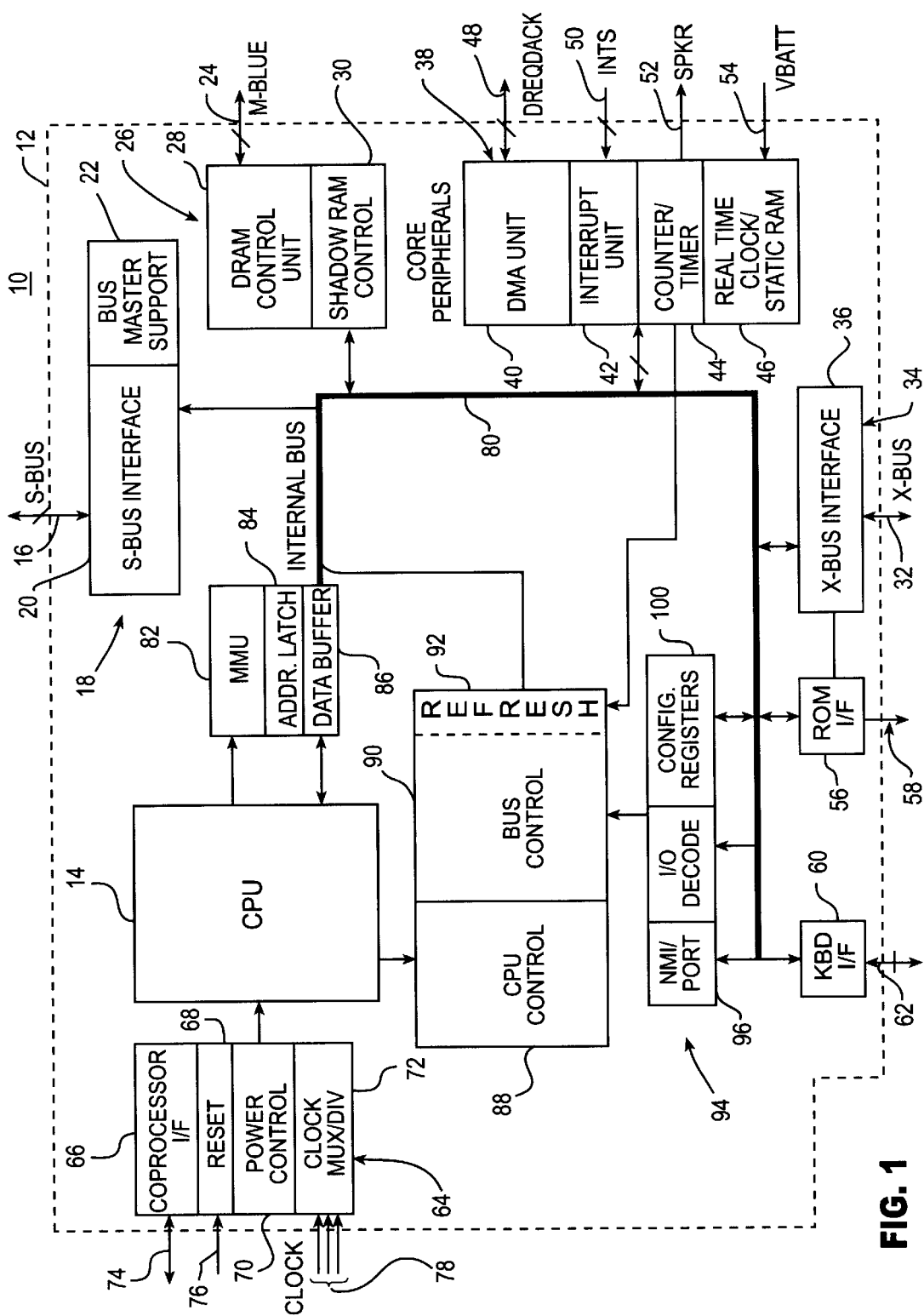
FIG. 1 is a system-level schematic drawing of the preferred embodiment of the present invention.

FIG. 1 is a system-level schematic diagram of the preferred embodiment of the present invention. In FIG. 1, an apparatus 10 is illustrated as situated on a single substrate 12. Apparatus 10 includes a computer processing unit 14, a connection 16 for an S-bus (not shown) and supportive peripheral devices 18 comprising an S-bus interface circuit 20 and a bus master support circuit 22. S-bus supportive peripheral devices 18 are preferably configured to accommodate direct connection of an S-bus to apparatus 10 with no additional peripheral devices required for an effective operative connection.

Similarly, a connection 24 for an M-bus (not shown) has associated therewith M-bus supportive peripheral devices 26, including a dynamic random access memory (DRAM) control unit 28 and a shadow random access memory (RAM) control unit 30. Preferably, M-bus supportive peripheral devices 26 are configured to allow direct connection of the M-bus to M-bus connection 24 with no additional supportive peripheral devices required for an effective operative connection.

A connection 32 with an X-bus (not shown) is also provided for apparatus 10. Associated with X-bus connection 32 are X-bus supportive peripheral devices 34, including an X-bus interface 36. X-bus supportive peripheral devices 34 are preferably configured to allow direct connection of the X-bus to X-bus connection 32 with no additional peripheral devices required for an effective operative connection.

In the environment in which it is anticipated the preferred embodiment of the present invention would be employed, i.e., an AT-configured computing system, the S-bus is intended for use as a system-expansion bus to which would be connected industry-standard signal generators, timing devices, and other expansion cards and subsystems. Similarly, in such a preferred AT system configuration, the M-bus is used for communication to direct DRAM interfaces, while the X-bus is employed as an expansion bus to effect connection with such devices as read-only memories (ROMs), keyboard controllers, numeric co-processors, and the like.

Apparatus 10 further comprises a plurality of core peripheral devices 38 which include, by way of example, a direct memory access (DMA) unit 40, an interrupt unit 42, a counter/timer device 44, and a real time clock and static RAM device 46. The various core peripheral devices 38 are operatively connected to input-output pins in order to perform their intended function. Thus, DMA unit 40 is operatively connected with input-output pins 48 in order to receive data request signals (DREQ) and transmit data acknowledgement signals (DACK), interrupt unit 42 is operatively connected with input-output pins 50 in order to receive interrupt signals (Ints), counter/timer device 44 is operatively connected with input-output pins 52 to provide operative connection with a system speaker (Spkr), and real time clock and static RAM device 46 is operatively connected to input-output pins 54 in order to receive power from a power supply, such as VBatt.

While ROMs and keyboard controllers are connectable to apparatus 10 X-bus connection 32, the preferred embodiment of apparatus 10 illustrated in FIG. 1 also provides for direct ROM connection to a ROM interface 56 through an input-output pins 58. Similarly, a keyboard interface 60 is also provided for access to apparatus 10 via input-output pins 62.

Also illustrated in the system-level diagram of FIG. 1 are additional supportive peripheral devices 64, including a co-processor interface 66, a reset circuit 68, a power control circuit 70, and a clock multiplexer and divider unit 72. Input-output pins are provided for access to the various additional supportive peripheral devices 64 so that co-processor interface 66 is connected with input-output pins 74, reset circuit 68 is connected with input-output pins 76, and clock multiplexer divider unit 72 is connected with a plurality of input-output pins 78.

An internal bus 80 is provided to effect communications among the various components of apparatus 10, including S-bus supportive peripheral devices 18, M-bus supportive peripheral devices 26, X-bus supportive peripheral devices 34, core peripheral devices 38, and computer processing unit 14. Computer processing unit (CPU) 14 is operatively connected with internal bus 80 via memory management unit (MMU) 82 and its associated address latch 84 and data buffer 86.

Computer processing unit 14 is responsive to a CPU control device 88, which CPU control device 88 is in intimate communicational relation with a bus control device 90. Bus control device 90 is operatively connected with internal bus 80 and includes a refresh generator 92 which is responsive to counter/timer 44 to periodically refresh specified components of apparatus 10, such as dynamic RAMs (DRAMs) through DRAM control unit 28.

Internal supportive peripheral devices 94 are situated intermediate internal bus 80 and bus control circuit 90, including a non-maskable interrupt (NMI) control port 96, an input-output decode circuit 98, and configurable registers 100.

Thus, apparatus 10 provides appropriate bus-accommodating means such as S-bus supportive peripheral devices 18, M-bus supportive peripheral devices 26, and X-bus supportive peripheral devices 34, as well as ROM interface 56 and keyboard interface 60, to support direct connection of peripheral devices via data buses to apparatus 10 with no additional supportive peripheral devices required. Effective and efficient internal communications within apparatus 10 are provided by internal bus 80, access to which is controlled by bus control circuit 90 so that computer processing unit 14 may provide information to or receive information from any of the several supportive external buses via internal bus 80. Further, information may be exchanged among the various external buses according to bus control circuit 90, as dictated by the program driving computer processing unit 14, all via internal bus 80.

In its preferred embodiment, apparatus 10 is configured on a single substrate 12 as an integrated digital circuit, thereby providing the advantages of higher operating speed, lower power consumption, and reduced occupancy of "real estate" in its physical embodiment.

In order to facilitate understanding of the present invention, like elements will be indicated by like reference numerals in the various drawings.

Figure 2:
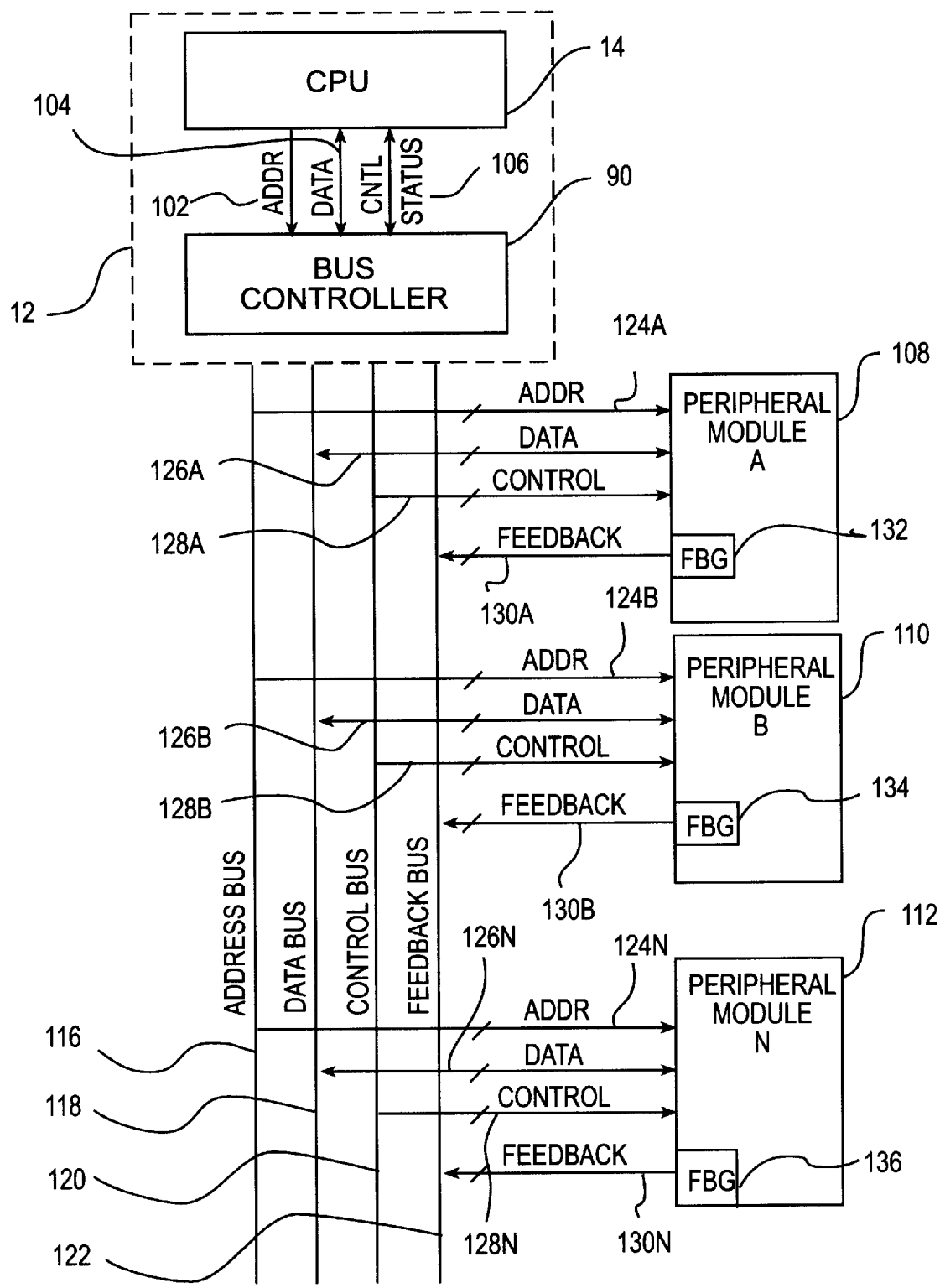
FIG. 2 is a schematic block diagram of the preferred embodiment of the present invention.

In FIG. 2, a computer processing unit 14 is operatively connected with a bus controller 90, which operative connection includes a CPU address bus 102, a CPU data bus 104, and a CPU control and status bus 106. Bus controller 90 is operatively connected with a plurality of peripheral modules 108, 110, 112 through a plurality of external buses 114. External buses 114 are external of substrate 12 upon which CPU 14 and bus controller 90 are situated. External buses 114 include an external address bus 116, an external data bus 118, an external control bus 120, and an external feedback bus 122.

Each of the peripheral modules 108, 110, 112 is operatively connected with external buses 114 by branch buses. Thus, peripheral module 108 is connected with external address bus 116 by branch address bus $124_a$, connected with external data bus 118 by branch data bus $126_a$, connected with external control bus 120 by branch control bus $128_a$, and connected with external feedback bus 122 by branch feedback bus $130_a$.

Similarly, peripheral module 110 is operatively connected with appropriate of external buses 114 by branch address bus $124_b$, by branch data bus $126_b$, by branch control bus $128_b$, and by branch feedback bus $130_b$.

Further, peripheral module 110 is connected with appropriate of external buses 114 by branch address bus $124_n$, by branch data bus $126_n$, by branch control bus $128_n$, and by branch feedback bus $130_n$.

Each of the branch feedback buses $130_a$, $130_b$, $130_n$ is operatively connected with its respective peripheral module 108, 110, 112 by a feedback generator. Thus, branch feedback bus $130_a$ is operatively connected with feedback generator 132 in peripheral module 108, branch feedback bus $130_b$ is operatively connected with feedback generator 134 in peripheral module 110, and branch feedback bus $130_n$ is operatively connected with feedback bus 136 in peripheral module 112.

Figure 3:
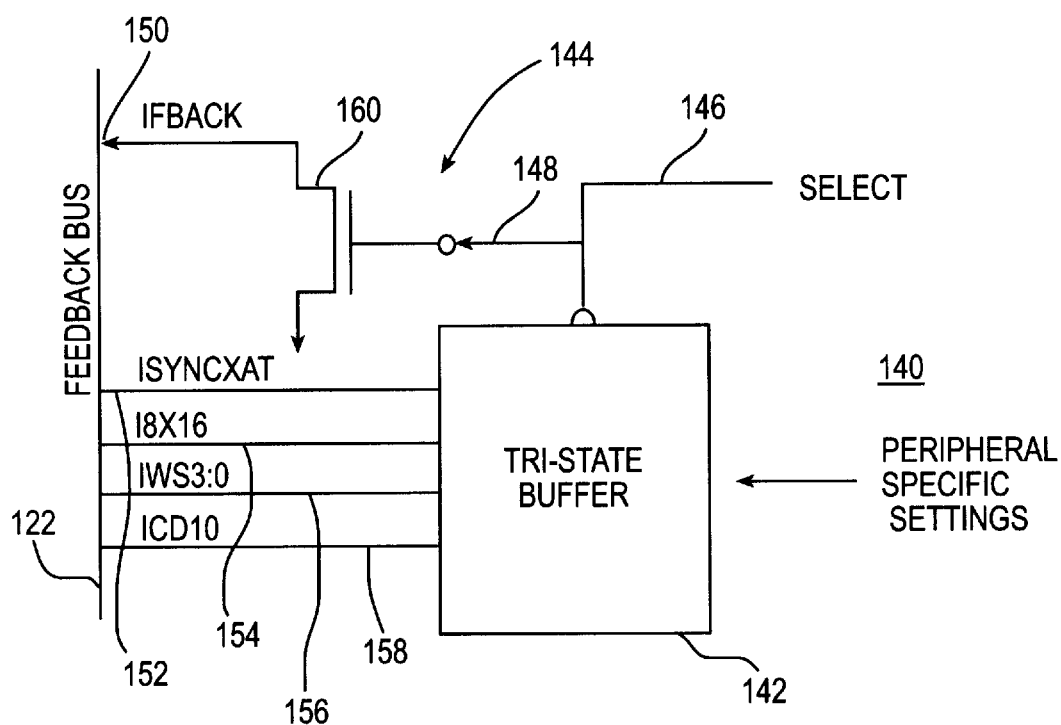
FIG. 3 is a schematic diagram of the feedback generator of the preferred embodiment of the present invention.

FIG. 3 is a schematic diagram of the feedback generator of the preferred embodiment of the present invention. In FIG. 3, a representative feedback generator 140 of the type employed in the system illustrated by FIG. 2 as feedback generator 132, 134, 136 is illustrated.

Feedback generator 140 comprises a tristate buffer 142 and a driver circuit 144. A select line 146 is connected to tristate buffer 142 and input 148 of driver circuit 144. Select line 146 preferably is provided from input-output decode circuit 98 (see FIG. 1). Specific settings for an associated peripheral module (such as peripheral modules 108, 110, 112 of FIG. 2) are set in tristate buffer 142. Branch feedback buses $130_a$, $130_b$, $130_n$ (see FIG. 2) actually each comprise a plurality of bus trunks, illustrated as feedback bus trunks 150, 152, 154, 156, 158 in FIG. 3.

Driver circuit 144 is preferably configured as an open-drain driver circuit so that application of a select signal by select line 146 to input 148 of driver circuit 144 pulls output 160 of driver circuit 144 low. Output 160 is operatively connected with external feedback bus 122 and signals conveyed by output external feedback bus 122 comprise a signal IFBACK.

Feedback bus trunks 152, 154, 156, 158 convey operating parameter indicating signals to external feedback bus 122 from tristate buffer 142 and represent the operating parameters of the respective peripheral module associated with feedback generator 140. By way of example, feedback bus trunk 152 may convey a signal ISYNCXAT, indicating whether the respective peripheral module is to operate synchronously or asynchronously; feedback bus trunk 154 may convey a signal I8X16, indicating whether the respective peripheral module is of an 8-bit or 16-bit size; feedback bus trunk 156 may convey a signal IWS3:0, indicating the number of cycle wait states associated with the respective peripheral module (i.e., how many cycles are required for the intended operation of the respective peripheral module); and feedback bus trunk 158 may convey a signal ICD1:0, indicating a cycle command delay (i.e., how many cycles should pass from initiation of a command until actual actuation of the command). Preferably, none of the signals conveyed by feedback bus trunks 152, 154, 156, 158 are recognized by the system of FIG. 2 unless signal IFBACK is low.

Figure 4:
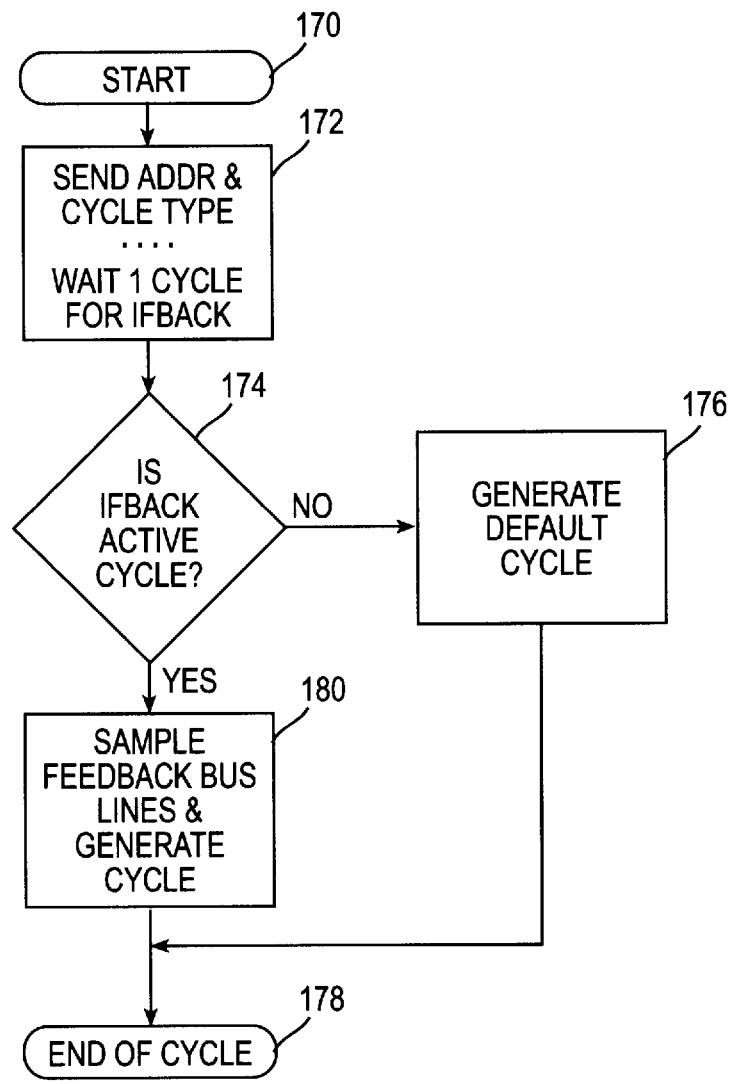
FIG. 4 is a flow diagram illustrating operation of the preferred embodiment of the present invention.

FIG. 4 is a flow diagram illustrating operation of the preferred embodiment of the present invention. In FIG. 4, a signal from CPU 14 (see FIG. 2) is operatively conveyed to bus controller 90 and thence forwarded by external address bus 116 to the peripheral modules 108, 110, 112. The cycle starts at block 170 of FIG. 4 and, by block 172, the address information and cycle-type information are sent via external address bus 116 and external control bus 120 to the various peripheral modules 108, 110, 112. Cycle-type information generally includes the type of operation to be effected in response to the command from CPU 14, such as a memory read or a memory write cycle, an input-output read or an input-output write cycle, or the like.

Further according to block 172, the system of FIG. 2 waits one cycle to check for a low signal IFBACK on external feedback bus 122. A low signal IFBACK provides a response to the query posed by block 174 whether there is an active signal IFBACK among the peripheral modules polled. If no low signal IFBACK is received by external feedback bus 122 at bus controller 90, then the "No" branch is taken from block 174. Then, according to block 176, a default cycle is generated and the system proceeds immediately to the end of the cycle according to block 178. The system then awaits reinitiation of a cycle to begin at block 170 in response to a signal from CPU 14.

If a low signal IFBACK is detected, then the "YES" branch is taken from block 174. Then, according to block 180, feedback bus trunks 152, 154, 156, 158 are sampled in order to ascertain the operational parameters appropriate for the intended operation.

The appropriate cycle (i.e., the intended operation) for the active peripheral module is executed, after which the system proceeds to the end of the cycle according to block 178. The system then awaits reinitiation of a cycle to begin at block 170 in response to an appropriate signal from CPU 14.

It is to be understood that, while the detailed drawings and specific examples given describe preferred embodiments of the invention, they are for the purpose of illustration only, that the apparatus of the invention is not limited to the precise details and conditions disclosed and that various changes may be made therein without departing from the spirit of the invention which is defined by the following claims:

We claim:

1. A system for managing communications between a computing device and a plurality of peripheral devices, the system comprising:

a bus controller means for interrogating said plurality of peripheral devices and controlling said communications, said bus controller means being operatively connected with said computing device;

a plurality of feedback generator means for providing operational status information, each respective peripheral device of said plurality of peripheral devices having an associated feedback generator means of said plurality of feedback generator means; and a bus means operatively connected with said bus controller means and with said plurality of peripheral devices for conveying signals between said bus controller means and said plurality of peripheral devices, including a data bus, an address bus, a control bus and a feedback bus, each said respective peripheral devices being configured for responding to said interrogating by communicating said operational status information to said bus controller means from said associated feedback generator means via said feedback bus, said operational status information including appropriate parametric information to enable said bus controller means to effect passing communication information on said data bus between said computing device and a particular said peripheral device and wherein said interrogating comprises transmission of an inquiry address by said bus controller means to said plurality of peripheral devices via said address bus, and transmission of cycle type information by said bus controller means to said plurality of peripheral devices on said control bus, each said respective peripheral device having a respective address, said particular peripheral device having said inquiry address as its said respective address, said particular peripheral device effecting said responding to said interrogating via said feedback bus in response to said inquiry address to indicate said particular peripheral device is active and ready, wherein said interrogating does not include providing information on said communication bus.

2. A system for effecting communications between a computing device and a plurality of peripheral devices as recited in claim 1 wherein said bus means comprises a plurality of parallel buses, said plurality of buses being configured for substantially simultaneous conveying of said operational status information on said feedback bus with said communication information on said data bus.

3. A system for effecting communications between a computing device and a plurality of peripheral devices as recited in claim 2 wherein bus comprises a plurality of parallel buses including an address bus, a data bus, said bus means is configured for substantially simultaneous conveying of said operational status information via said feedback bus, data via said data bus, and control information via said control bus.

4. A system for effecting communications between a computing device and a plurality of peripheral devices as recited in claim 2 wherein said particular peripheral device providing said operational status information every time said inquiry address is provided on said address bus as its said respective address.

5. A computer system, comprising:
   a bus structure including an address bus, a control bus, a data bus and a feedback bus;
   a plurality of peripheral devices coupled to the address bus, the control bus, the data bus and the feedback bus, each of the peripheral devices having a unique address;
   a bus controller coupled to the address bus, the control bus, the data bus, and the feedback bus, wherein the bus controller provides a first address on the address bus and cycle type information on the control bus, and a selected one of the peripheral devices having the unique address associated with the first address provides parametric information about the selected one of the peripheral devices on the feedback bus in response to the first address being provided on the address bus to indicate the selected one of the peripheral devices is ready and active, said selected one of the peripheral devices providing the parametric information without receiving information on the data bus in response to the first address and the cycle type information.

6. The computer system of claim 5 wherein the peripheral devices each include a feedback generator coupled to the feedback bus, the feedback generator providing the parametric information on the feedback bus in response to the unique address being provided on the address bus and the cycle type information being provided on the control bus.

7. The computer system of claim 6 wherein the feedback generator includes a tri-state buffer coupled between the feedback bus and a register which stores the parametric information, the tristate buffer coupling the register to the feedback bus when the first address for the selected one of the peripheral devices is provided on the address bus.

8. The computer system of claim 5 wherein the feedback generator includes a driver, the driver provides an acknowledge signal to the feedback bus when the first address for the selected one of the peripheral devices is provided, the acknowledge signal indicating that parametric information is being presented on the feedback bus from the selected one of the peripheral devices.

9. The computer system of claim 8 wherein the driver is a transistor having one terminal coupled to a logic low.

10. The computer system of claim 6 wherein the parametric information includes bus size information, cycle command delay information, and cycle wait state information.

11. The computer system of claim 6 wherein the feedback bus includes an acknowledge conductor and a bus size conductor.

12. A method of communicating parametric information between a bus controller and a plurality of peripheral devices in a computer system, the peripheral devices being coupled to the bus controller via a bus architecture including an address bus, a control bus, a data bus, and a feedback bus, the method comprising steps of:
   addressing a selected device of the plurality of peripheral devices with the bus controller by providing a particular address signal on the address bus, and by providing cycle type information on said control bus, the particular address signal corresponding to the selected device;
   providing the parametric information from the selected device to the bus controller on the feedback bus without receiving a command on the data bus in response to the particular address signal and the cycle type information being provided on the address bus, the parametric information being provided on the feedback bus to indicate the selected device is active and ready.

13. The method of claim 12 wherein the feedback bus includes a feedback acknowledge line.

14. The method of claim 13 further comprising steps of:
   providing a feedback acknowledge signal with the selected device on the feedback acknowledge line while providing the parametric information on the feedback bus; and
   receiving the parametric information on the feedback bus with the bus controller in response to the feedback acknowledge signal.

15. The method of claim 14 further comprising a step of:
   providing data from the selected device on the data bus while providing the parametric information on the feedback bus.

16. The method of claim 14 further comprising steps of:
   addressing a particular device of the peripheral devices by providing a selected address signal on the address bus with the bus controller, the selected address signal corresponding to the particular device;
   waiting for the feedback acknowledge signal on the feedback acknowledge line from the particular device; and
   utilizing default parametric information stored in the bus controller if the feedback acknowledge signal is not received within a predetermined period.

17. The method of claim 12 wherein the parametric information is provided on the feedback bus in response to the particular address signal being provided on the address bus.

18. The method of claim 17 wherein the selected device includes a feedback generator, the feedback generator providing the parametric information on the feedback bus in response to the particular address signal on the address bus.

19. The method of claim 12 wherein the selected device includes a feedback generator, the feedback generator providing the parametric information on the feedback bus in response to the particular address signal on the address bus.

20. The method of claim 12 wherein the selected device is a communication device and the parametric information includes command delay information.

* * * * *